(12) United States Patent
Spoto et al.

(10) Patent No.: US 8,338,049 B2
(45) Date of Patent: Dec. 25, 2012

(54) MONOCRYSTALLINE SILICON FLOW CONNECTOR AND MICROFLUIDIC SYSTEM MODULARLY BUILT THEREON FOR FEEDING A FUEL SOLUTION TO AN ENERGY CONVERTING DEVICE

(75) Inventors: Giuseppe Emanuele Spoto, Trecastagni (IT); Roberta Giuffrida, Catania (IT); Salvatore Leonardi, Aci S. Antonio (IT); Salvatore Abbisso, Augusta (IT)

(73) Assignee: STMicroelectronics S.R.L., Agrate Brianza (MB) (IT)

( * ) Notice: Subject to any disclaimer, the term of this patent is extended or adjusted under 35 U.S.C. 154(b) by 1325 days.

(21) Appl. No.: 11/619,090

(22) Filed: Jan. 2, 2007

(65) Prior Publication Data

US 2007/0178360 A1 Aug. 2, 2007

(30) Foreign Application Priority Data

Jan. 2, 2006 (EP) ..................................... 06425001

(51) Int. Cl.
*H01M 2/38* (2006.01)
*H01M 2/40* (2006.01)
*H01M 8/04* (2006.01)
*H01M 8/22* (2006.01)
*H01M 8/24* (2006.01)
*B05D 5/12* (2006.01)

(52) U.S. Cl. ........ 429/458; 429/457; 429/506; 429/513; 427/115

(58) Field of Classification Search .................. 429/34, 429/447, 458, 506, 513; 427/115
See application file for complete search history.

(56) References Cited

U.S. PATENT DOCUMENTS

| 2003/0003347 A1* | 1/2003 | D'Arrigo et al. | 429/44 |
| 2003/0031908 A1* | 2/2003 | Bostaph et al. | 429/30 |
| 2005/0084738 A1* | 4/2005 | Ohlsen et al. | 429/39 |
| 2005/0282054 A1* | 12/2005 | Ishida et al. | 429/34 |

FOREIGN PATENT DOCUMENTS

EP 1258937 11/2002

OTHER PUBLICATIONS

Yao et al., Micro-Electro-Mechanical Systems (MEMS)-based Micro-Scale Direct Methanol Fuel Cell Development, Energy, Pergamon Press, Oxford, GB, vol. 31, No. 5, Apr. 5, 2006, pp. 636-649.
Yamazaki, Application of MEMS Technology to Micro Fuel Cells, Electrochimica ACTA, Elsevier Science Publishers, Barking, GB, vol. 50, No. 2-3, Nov. 30, 2004.

* cited by examiner

*Primary Examiner* — Basia Ridley
*Assistant Examiner* — Sean P Cullen
(74) *Attorney, Agent, or Firm* — Allen, Dyer, Doppelt, Milbrath & Gilchrist, P.A.

(57) ABSTRACT

A microfluidic system through which a solution of at least an oxidable compound is fed to a feed manifold of an energy converting electrochemical device includes a flow connector. The flow connector includes a silicon platform having a bottom side and an opposing top side, and through holes extending therethough. The silicon platform includes first and second channels defined on the bottom side for communicating with the through holes. The second channel forms an inlet for the feed manifold of the energy converting electrochemical device when the bottom side of the silicon platform is coupled to a flat coupling area of the device. A micropump module is coupled to the top side of the silicon platform for communicating with the through holes in the first and second channels. First and second supply cartridges are coupled to the top side of the silicon platform for communicating with the through holes in the first channel.

19 Claims, 8 Drawing Sheets

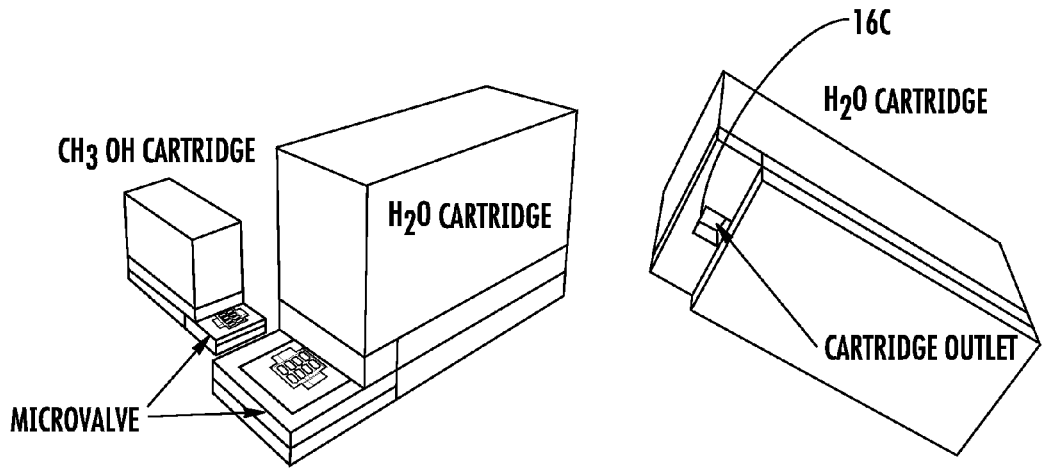
*FIG. 10A*  *FIG. 10B*
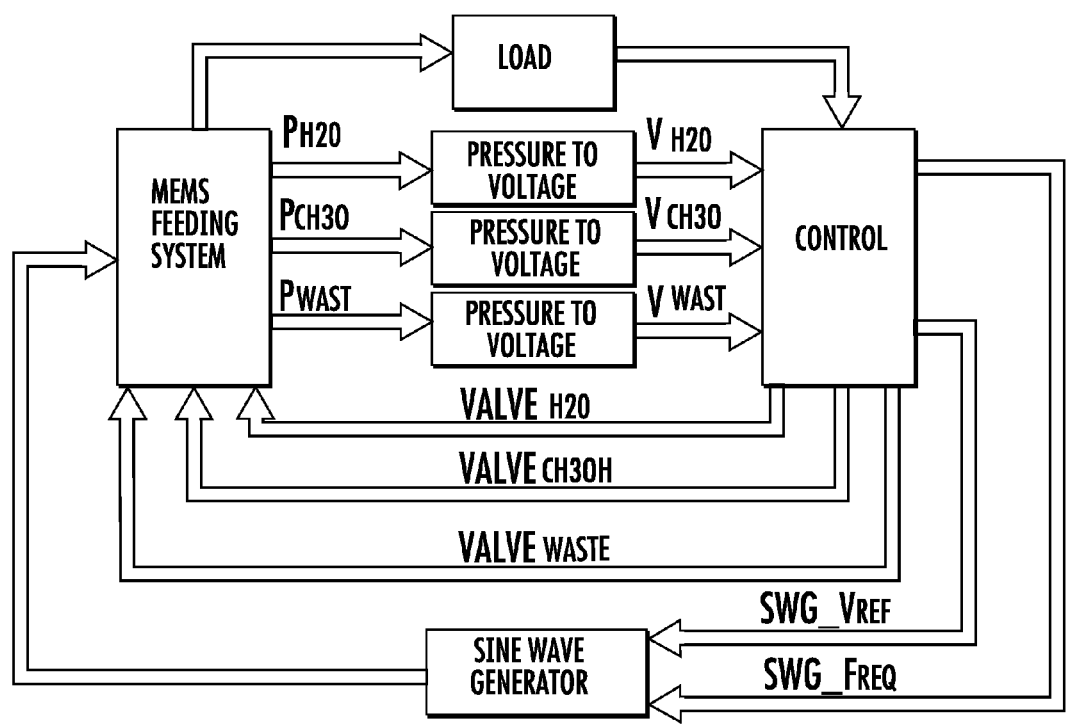
*FIG. 11*

__MONOCRYSTALLINE SILICON FLOW CONNECTOR AND MICROFLUIDIC SYSTEM MODULARLY BUILT THEREON FOR FEEDING A FUEL SOLUTION TO AN ENERGY CONVERTING DEVICE__

FIELD OF THE INVENTION

The present invention relates to energy converting devices in the form of a single or a plurality of electrochemical cells, to at least an electrode of which a solution containing an oxidable compound is fed. In particular, the invention relates to fuel cells or to stacks composed of a plurality of cells, the intercell and terminal conductive bodies of which are of micromachined monocrystalline silicon.

BACKGROUND OF THE INVENTION

Polymeric electrolyte membrane fuel cells (PEMFC) are being developed for gaseous hydrogen fuel feed at the negative electrode (anode) for producing water at the positive electrode (cathode) by combining hydrogen ions migrating through the polymeric electrolyte with the oxygen of an air stream supplied to the cathode. The use of less hazardous and naturally available methanol in aqueous solution as fuel has advantages especially in terms of a safer portability and availability of fuel.

The overall reaction occurring in a direct methanol fuel cell (DMFC) is the same as that of direct combustion of methanol:

$$CH_3OH + 3/2 O_2 \rightarrow CO_2 + 2H_2O$$

Considering that a fuel cell operates isothermally, all the free energy associated with the above reaction should in principle be convertible to electrical energy. However, kinetic constraints of the two electrode (half cell) reactions, and the net resistive components of the cell, significantly reduce the energy conversion efficiency. As a result, the working voltage of the cell falls with increasing current drain. These losses are generally referred to as polarization loss and their minimization is a crucial objective in fuel cell research and development.

When a reagent is fed in solution to the electrode of an electrochemical cell, this is different from the situation in which a reagent like hydrogen is fed in gaseous form to the active electrode. This may be with respect to an anode of a fuel cell or of a redox flow cell or any other electrochemical cell. With the kinetic of mass transfer of the reacting species to the active reaction sites, the electrode becomes a major factor of overall polarization effects. This is in consideration of the diffusive mechanisms across the interface between the solid electrode and the solution and within the bulk of the solution, essentially governed by concentration gradients.

Under these conditions, a forced circulation of the solution of the reagent through the electrode compartment reduces polarization effects by equalizing concentration gradients in the bulk of the solution and preventing excessive localized depletion of the reagent species over the whole active area of the cell (electrode).

The advanced development of micro-machining technologies of monocrystalline silicon that has permitted the formation of microelectro-mechanical devices and sensors on silicon (MEMS) and the same technologies have also found application in the fabrication of electrochemical cells of micro to small size (up to wafer-size cells).

The relative small dimensions of silicon based electrochemical cells and batteries composed by a multicell stack and the relatively low mechanical strength of monocrystalline silicon bodies render the functional connection of the cell or stack of cells to a microfluidic system for the controlled feeding of a solution containing electrochemically reactive species to at least one of the electrodes of the cell problematic, and generally costly. This is because of the need to ensure an acceptable mechanical sturdiness of the connections and hydraulic sealing of the microfluidic feed system to be connected in a leak proof manner to the relative electrode compartment of a cell to the homologous or compartments of a multicell stack.

SUMMARY OF THE INVENTION

An object of the present invention is to overcome the above difficulties and inconveniences.

This is based on providing of a flow connector in the form of a micromachined monocrystalline silicon plate or platform, on a side of which all the functional components of the microfluidic feed system are fixed and connected in a leak proof manner. The monocrystalline silicon platform may have a channeled bottom side that is coupled onto a flat surface of a terminal silicon body of the energy conversion device to which the solution is to be fed.

The coupling of the channelled silicon platform constituting the flow connector onto a receiving flat surface of the terminal silicon body of the device to be fed with the solution can be realized by any suitable known technique for permanently joining together in a leak proof manner two distinct monocrystalline silicon bodies. Preferably, the coupling is made by a wafer bonding technique optionally employing an adhesive.

The microfluidic solution feed system is realized on top of the silicon platform constituting the flow connector element by fixing over the top surface of the silicon platform prefabricated functional components of the microfluidic system. The system includes at least a silicon micropump module having an inlet or suction port and an outlet or delivery port coinciding with respective holes through the silicon platform constituting the flow connector, that open in distinct channels, a suction channel and a delivery channel, respectively, defined in the bottom side of the silicon platform.

The system includes a plurality of silicon micro valve modules fixed onto the silicon platform corresponding to the holes through the silicon platform that functionally open either into the channel leading to the suction port hole of the pump, or into the channel into which the delivery port hole of the pump opens.

Distinct solvent (water) and a soluble oxidable compound or fuel (methanol) cartridges are fastened onto the silicon platform, each having an outlet aperture coincident with the inlet port of a respective release microvalve module.

Preferably, a depleted solution waste recovery cartridge is also mounted on the silicon platform and has an inlet aperture coincident with the outlet port of a third discharge microvalve module, the inlet port of which coincides with a hole reaching the delivery channel of the micropump.

The silicon microvalves may be of the NC type (normally-closed) and are preferably of the thermomechanical type, to be opened by forcing an electric current through a thermoelectric actuator for opening the inner flow orifice of the valve.

The silicon micropump is preferably of the piezoelectric type. It may alternatively be of any other commonly known type of silicon micropumps, for example, a bimetallic, an electrostatic or a thermopneumatic type.

By fixing with an appropriate adhesive each functional component module onto the monocrystalline silicon platform, this ensures the necessary leak proof coupling of the respective flow apertures or ports of the component modules to the respective ports or holes through the silicon platform. The appropriate adhesive may be, for example, an epoxy resin adhesive or a different sealing adhesive.

Also, upon bonding the channeled bottom side of the monocrystalline silicon platform constituting the flow connector of the system onto a receiving flat surface of a monocrystalline silicon terminal body of the energy converting device, and having at least an inlet port and an outlet port of the solution, the whole assembly assumes a very compact and solid construction. This practically overcomes any criticalness relating to mechanical sturdiness of the assembly, and of necessary leak proof hydraulic couplings among the component parts that define the microfluidic system flow paths.

BRIEF DESCRIPTION OF THE DRAWINGS

The different aspect and advantages of this invention will become even more evident through the following description of an embodiment for a direct methanol fuel cell stack, with reference to the attached drawings, wherein:

FIGS. 10a and 10b are partial three-dimensional views illustrating the coupling onto a respective release microvalve module for one cartridge of the microfluidic fuel feed system that is modularly composed over the silicon flow connector according to the present invention;

FIG. 11 depicts one embodiment of the control unit of the microfluidic solution feed system according to the present invention;

DETAILED DESCRIPTION OF THE PREFERRED EMBODIMENTS

The illustrative embodiment depicted in the figures relates to an important application of a silicon flow connector based microfluidic feed system to a silicon fuel cell stack, through the anode compartments of which is circulated an aqueous solution of methanol, the molarity of which may be generally controlled to be in a range from 0.5 M to 2 M, or even higher.

Generally, for this type of application, the cell area size may be on the order of 20 to 100 $cm^2$, appropriate for realizing a portable power source for recharging batteries of electronic instruments PCs, GPS systems, communications devices and alike.

Figure 1:
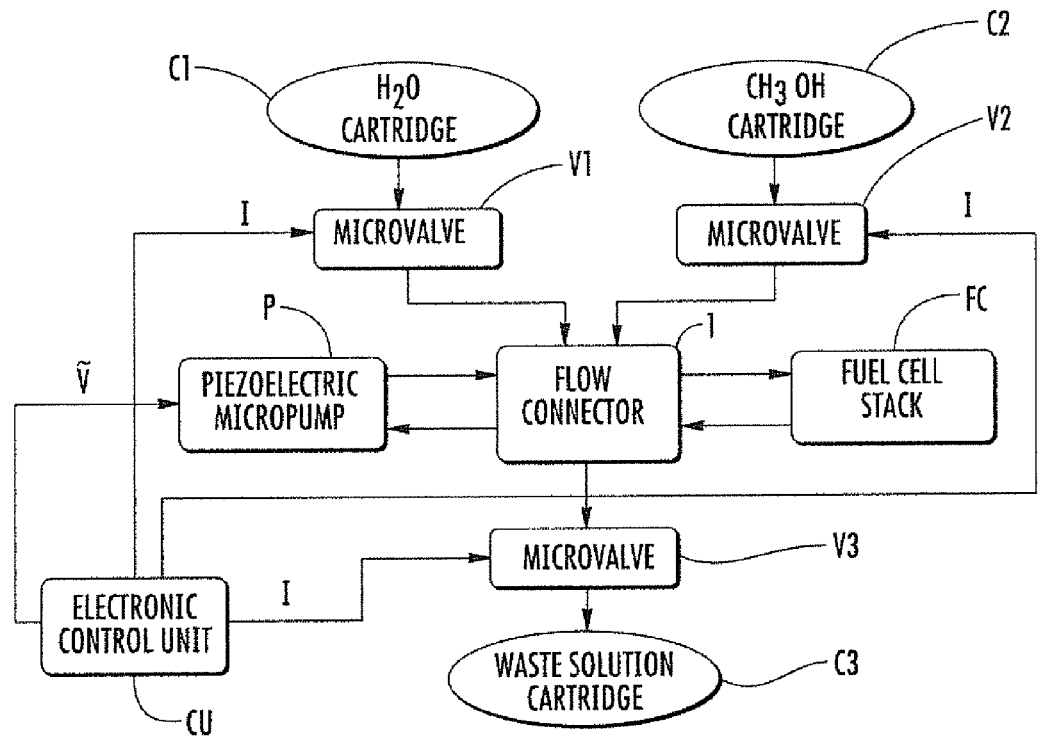
FIG. 1 is a functional diagram of a microfluidic fuel solution feed system for a micro fuel cell stack based on a silicon flow connector according to the present invention.

The overall functional diagram of the fuel feed system is depicted in FIG. 1. The presence of three distinct reservoirs or cartridges is contemplated. A first cartridge C1 contains a certain volume of demineralized water, a second cartridge C2 contains a certain volume of methanol, and in a third cartridge C3 a depleted solution may be periodically drained for replenishing the system with fresh fuel solution (refresh operation).

The supply cartridges C1 and C2, of $H_2O$ and $CH_3OH$, respectively, have their discharge orifice controlled by respective release microvalves V1 and V2 and so is the inlet orifice of the waste solution cartridge C3 by a dedicated third drainage microvalve V3.

As will be described in detail below, the flow connector 1 defines at least a suction channel and a delivery channel that respectively connect the suction and delivery ports of a piezoelectric micropump P to an inlet manifold and to an outlet manifold of the fuel solution to and from the fuel cell stack FC.

The three microvalves V1, V2 and V3 and the piezoelectric micropump P are programmably driven by an electronic control unit CU. The opening of the normally closed microvalves V1, V2, V3 is commanded by circulating a current I through a thermoelectric actuator.

The piezoelectric micropump P is driven by controlling the voltage and/or frequency applied to piezoelectric crystal fastened to a pump membrane that transmit vibrations to liquid contained in a pump chamber, having monodirectional suction valve and a monodirectional delivery valve.

Figure 2:
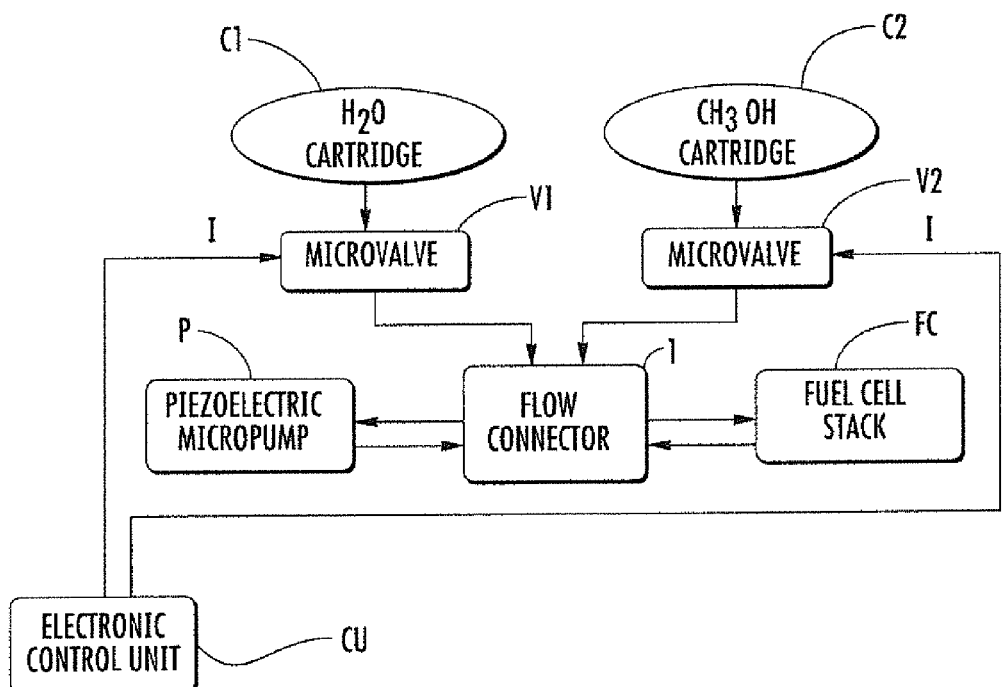
FIG. 2 shows the resultant flow diagram during a preliminary phase of gravity filling the microfluidic feed system with fuel solution according to the present invention.

In FIG. 2 is represented the resultant flow circuit of the system during a preliminary phase of filling the microfluidic fuel feed circuit with a solution of methanol in water, by gravity. During this filling step, the micropump P is not driven, while the release microvalves V1 and V2 that control the release of the content of the water cartridge C1 and of the methanol cartridge C2, are opened for precisely predetermined intervals of time in order to fill the system with a solution of methanol of the desired molarity (concentration).

Once the gravity filling of the fluid circuit of the system is complete, any current drive to the release microvalves V1 and V2 from the supply cartridges C1 and C2 is terminated causing the closure of both valves.

An operating phase of energy conversion of chemical energy into electrical energy with circulation of an electric current in an external load circuit of the battery is conducted by activating the micropump P, by the application of a controlled AC voltage to the piezoelectric crystal mechanically fastened to a membrane that transfers the vibration induced by the piezoelectric crystal to the fluid contained in the pump chamber connected to the inlet and output ports through monodirectional microvalves. The valve stopper may be a cantilever arm, normally abutting over the valve flow orifice.

Figure 3:
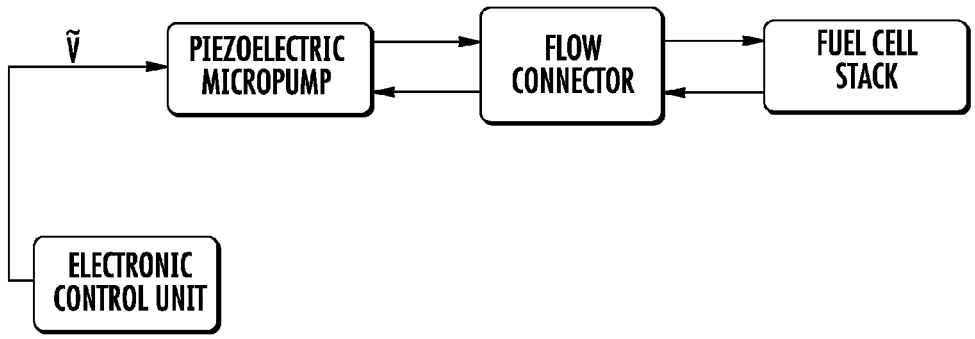
FIG. 3 shows the resultant flow diagram of feed solution recirculation through homologous cell compartments of the stack during an operating phase of the fuel cell according to the present invention.

FIG. 3 is a representation of the resultant flow circuit of the fuel feed system during a phase of energy conversion taking place in the microfuel cell stack FC. Of course, the energy conversion process occurring in the fuel cell FC through a direct methanol oxidation to carbon dioxide and water, is supported by the circulation of electric current in the load circuit connected to the terminal cathode (+) and to the terminal anode (−) of the fuel cell or multiple fuel cell stack.

During this phase, mass transfer of the reactive methanol to the anodically polarized active sites (three phase sites) in the typically porous anode structure, is promoted by a continuous circulation of the methanol solution through the anodic compartments) of the fuel cell(s).

As the concentration of methanol in the circulating solution progressively decreases in the volume of solution initially loaded in the system, the attendant decline of the cell voltage can be countered to some extent by increasing progressively the rate of circulation of the solution by increasing the drive voltage and/or changing the frequency that is applied to the piezoelectric crystal of the micropump.

Once limit conditions of depletion of the circulating fuel solution are reached, as denounced by the dropping of the cell voltage to an established limit value, a refreshing of the circulating methanol solution is necessary.

Figure 4:
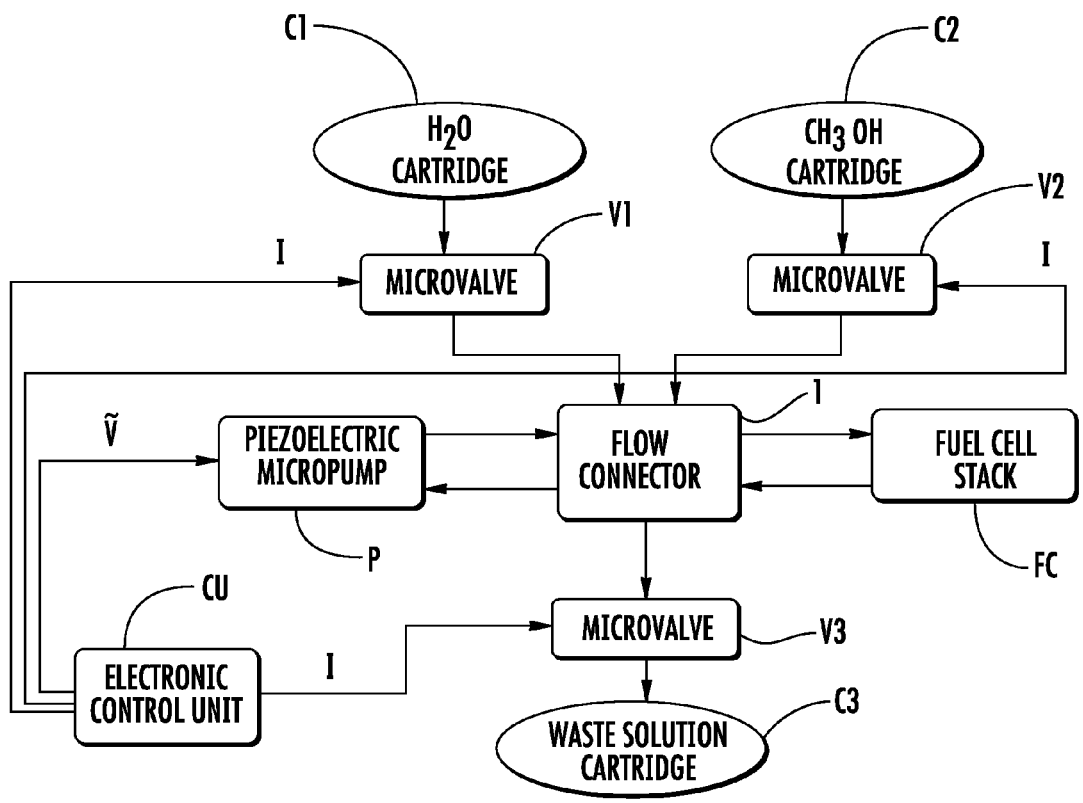
FIG. 4 shows the resultant flow diagram during a phase of draining depleted fuel solution from the system into a dedicated waste solution cartridge according to the present invention.

According to the embodiment shown, this phase of refreshing the fuel solution that is circulated through the fuel cell(s) anode compartment(s) is implemented by commanding a resultant configuration of the fluid circuit as depicted in FIG. 4.

The bleed microvalve V3 of depleted solution from the fuel cell circuit into the waste solution cartridge CS is commanded open while continuing to pump the solution in circulation, and the methanol release microvalve (and successively and independently also the water release microvalve, if necessary) is also opened. Therefore, a bleeding of the solution into the waste solution cartridge C3 takes place, the bled volume of which is replenished with methanol drawn into the fuel cell circuit from the supply cartridge C2, until the cell voltage rises back according to the expected value, optionally opening also the water supply microvalve V1 for computed intervals of time.

This refresh operation is driven by a pressure difference that exists between suction and delivery channels to the micropump, and by a positive difference of free liquid levels between the supply cartridges C1 and C2 (initially full) and the waste solution recovery cartridge C3 (initially empty).

Once desired refreshed conditions are achieved, the bleed microvalve V3 for discharging solution into the waste solution cartridge C3 is closed by interrupting any further electric current drive to it, and thereafter, also the methanol and/or eventually water supply microvalves V2 and V1 are closed to return the system to the normal operating configuration of FIG. 3.

Figure 5:
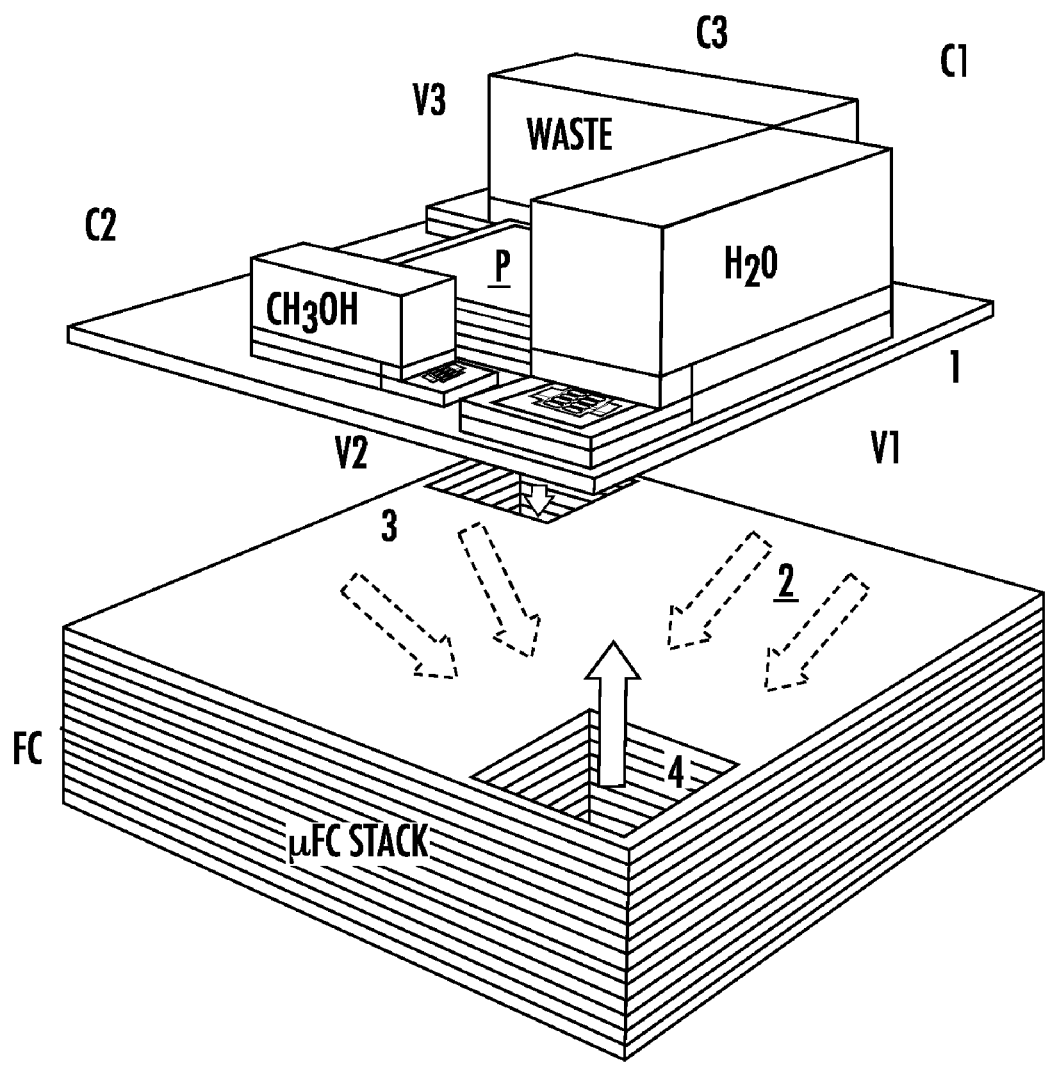
FIG. 5 is a graphical representation of a flow connector carrying the functional modules of the feed system to be coupled onto the upper terminal element of a stack of electrochemical cells according to the present invention.

FIG. 5 depicts how the silicon flow connector 1 carrying the functional components of the microfluidic feed system fixed onto the silicon platform 1 is finally coupled onto the flat silicon surface of the end of a multicell stack. On the flat surface 2 of the terminal element open an inlet manifold 2 through which the fuel feed solution is distributed to the anodes of the multiple cell stack, and an outlet manifold 3 from which the solution circulated by the main pump in the monofluidic fuel feed circuit returns to the pump, as graphically indicated by the dash line arrows.

Figure 6:
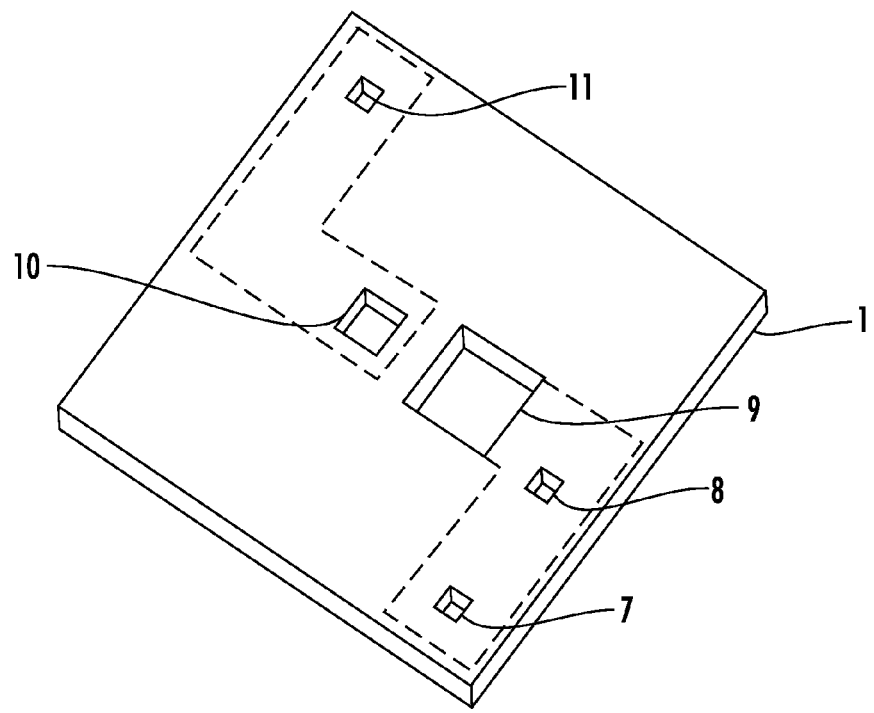
FIGS. 6 and 7 are three-dimensional views from top and bottom, respectively, of the monocrystalline silicon flow connector platform of the embodiment of FIG. 5.
Figure 7:
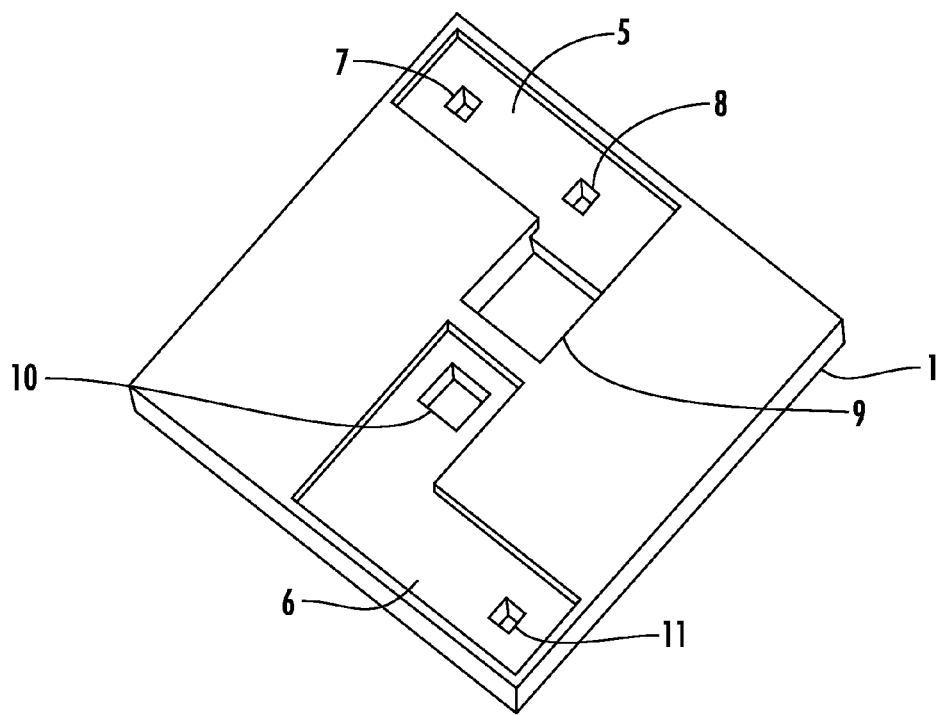

The micromachined monocrystalline silicon platform 1 constituting the flow connector is illustrated in FIGS. 6 and 7, respectively, a three-dimensional view from above and a three-dimensional view from below. The thickness of the monocrystalline silicon platform 1 may generally be comprised between 0.2 mm and 0.5 mm or exceptionally even larger.

As identified in FIG. 6 by phantom broken lines, and visible in FIG. 7, two distinct channels or extended recesses 5 and 6 of depth substantially uniform are formed in the bottom side of the monocrystalline silicon platform 1. The depth of the channels 5 and 6 is preferably comprised between 10% and 30% of the full thickness of the monocrystalline silicon platform 1.

As visible in both FIGS. 6 and 7, a plurality of through holes are formed in the monocrystalline silicon, reaching the channels 5 and 6, respectively.

The through hole 7 coincides with the outlet port of the silicon microvalve module V1 fixed onto the platform, the inlet port of which couples with a discharge orifice of the water supply cartridge C1. The through hole 8 coincides with the outlet port of the silicon microvalve module V2 fixed onto the platform, the inlet port of which couples to a discharge orifice of the water to the outlet of the water supply cartridge C1.

The through hole 9 at the inner end of the suction channel 5 coincides with the suction port of the silicon micropump module p fixed onto the platform, the delivery port of which coincides with the through hole 10 reaching the delivery channel 6. The through hole 11 coincides with the inlet port of the silicon microvalve module V3 fixed onto the platform, the outlet port of which couples with the inlet orifice of the waste solution cartridge C1.

The channels 5 and 6 and the through holes 7, 8, 9, 10 and 11 can be formed by anisotropic etching of the monocrystalline silicon using as etchant KOH, according to a well-known silicon micromachining practice.

The through holes and the channels 5 and 6 may be formed through a unified etching step by differentiating as needed the etching depth between the microchannels 5 and 6 and the through holes 7-11 by depositing and patterning layers of etch retarding material commonly of silicon oxide.

The formation of protective and/or of retardant layers can normally be carried out in appropriate ovens, while the definition of the etch areas can be done by common photolithographic techniques.

Figures 8A, 8B:
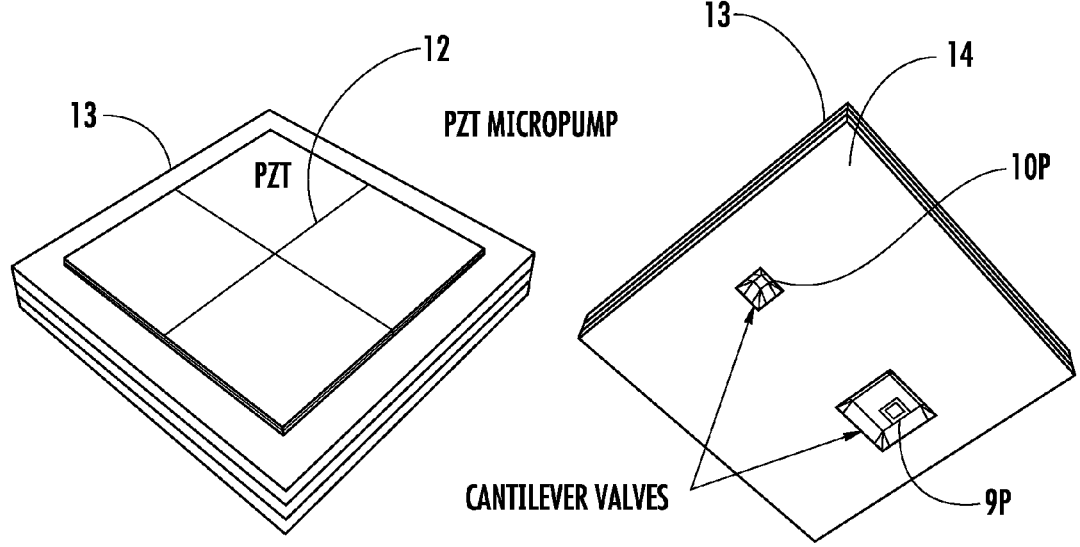
FIGS. 8a and 8b are three-dimensional views from top and bottom, respectively, of the piezoelectric micropump module of the microfluidic system composed on the silicon flow connector according to the present invention.

FIGS. 8a and 8b are three-dimensional views of a piezoelectric silicon micropump. The constitution and architecture of these silicon micropumps are well-known to the skilled person. In the view of FIG. 8a are depicted the piezoelectric crystal transducer 12, to which a controlled AC voltage is applied (electrical connections not shown in the drawing), mechanically fastened onto a micromachined silicon membrane 13 closing an inner chamber of the pump.

In the view of FIG. 8b is visible the bottom closure 14 of the pump chamber and the monodirectional cantilever valve of the suction port 9p and of the deliver port 10p of the pump chamber. Of course, the fixing of the silicon piezoelectric micropump P onto the silicon platform 1 as depicted in FIG. 5, is done respecting a perfect alignment of the suction port 9p of the pump with the through hole 9 of the silicon flow connector 1 and of the delivery port 10p of the pump with the through hole 10 of the flow connector 1.

Figures 9A, 9B:
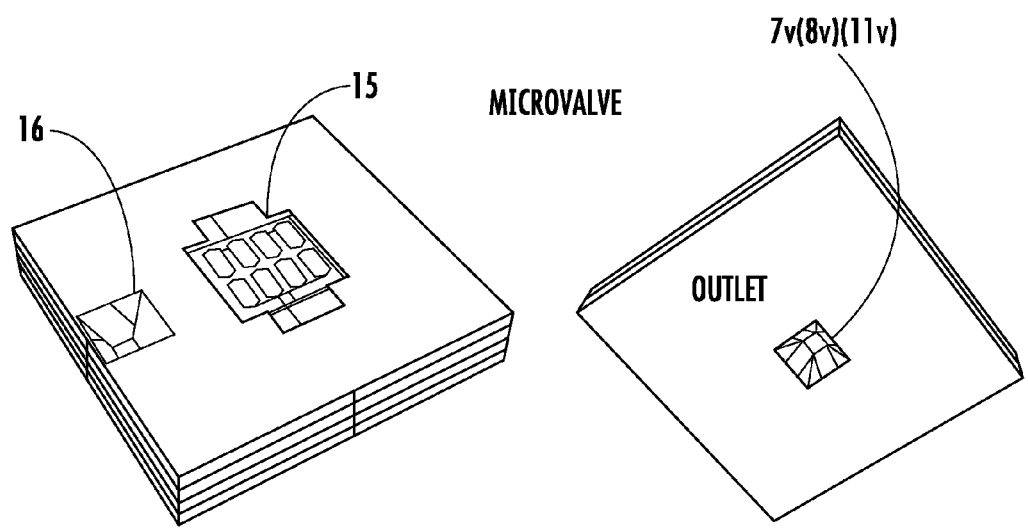
FIGS. 9a and 9b are three-dimensional views from top and bottom, respectively, of a thermo mechanically actuated microvalve used in the microfluidic system composed on the silicon flow connector according to the present invention.

FIGS. 9a, 9b are three-dimensional views of the two release and bleed silicon microvalves V1, V2 and V3 associated to the water supply cartridge C1 and to the methanol supply cartridge supply C2, respectively, and to the waste solution recovery cartridge C3.

The silicon microvalves may preferably be of the thermoelectric type including a thermoelectrically driven stopper. The heat input by the Joule effect to open the valve stopper is provided by forcing a current through resistive elements (indicated in FIG. 9a by the metallization pattern 15) that define pads for electrically connecting the valve to the control circuit.

The port 7b (8b) visible in the bottom side view of the microvalve module of FIG. 9b is aligned with the respective through hole 7 or 8 or 11 of the silicon flow connector 1, while the other port of the valve 16 present on the top side, visible in FIG. 9a, couples with the release or inlet orifice of the respective cartridge.

In FIG. 10b is shown the bottom side of a cartridge reservoir from which is observable the aperture 16c present in a stepped portion of the bottom of the cartridge overlapping a portion of the associated microvalve module such to couple with the upper side port 16 of the silicon microvalve module for controlling either the release of fluid from the cartridge or the bleeding of depleted solution into the cartridge.

While the silicon functional modules of the micropump and of the microvalves are permanently bonded onto the monocrystalline silicon 1 constituting the flow connector of the feed system to the energy conversion device, the supply cartridges C1 and C2 and the waste solution cartridge C3 are coupled to the respective valve modules V1, V2 and V3 and held fast onto the silicon platform 1 not in a permanent manner but preferably in a manner that will permit an easy and quick replacement of the cartridges with new ones.

To this end, the cartridges may be alignedly fixed on the silicon platform using a soft adhesive, for example silicone. According to an alternative embodiment, each cartridge may include an interconnect element that may be permanently fixed in a leak proof manner onto the respective microvalve module and on the immediately adjacent surface of the silicon platform. The interconnect element or sub-module will have a male or female part of a snap-action coupling suitable to receive and retain a cartridge provided with a coordinately installed female or male part of the snap-action coupling.

According to this embodiment, the coupling, besides hydraulically connecting the reservoir to the microfluidic fuel feed system will also provide an adequate mechanical retention of the replaceable cartridge onto the interconnect element, permanently fixed onto the silicon platform. The coupling part fitted at the bottom of the removable cartridge may include a removable or breakable seal that is removed or broken before or upon forcing the snap-action coupling parts to join together.

The water supply cartridge (and optionally also the waste solution recovery cartridge) may be provided with a liquid impermeable gas vent for atmospheric pressure equalization and for prevent vacuum locks, according to common hydraulic practices.

The control unit C1 can have any appropriate architecture depending on the design of the microfluidic solution feed system, design approach of the control system and relative deployment of sensors to monitor functioning parameters of the energy conversion device including, for example, the liquid content of the distinct water, methanol and waste recovery cartridges of the illustrated application for a fuel cell stack device.

Generally, as depicted in FIG. 11, a control unit of the control system of a fuel cell stack of the described embodiment will include a multiplexed analog-to-digital converter ADC MUX and a bank of digital-to-analog converters DAC(s) for controlling the microvalves and the drive voltage SWG_$V_{REF}$ and frequency SWG_Freq, applied to the piezoelectric micropump.

Figure 12:
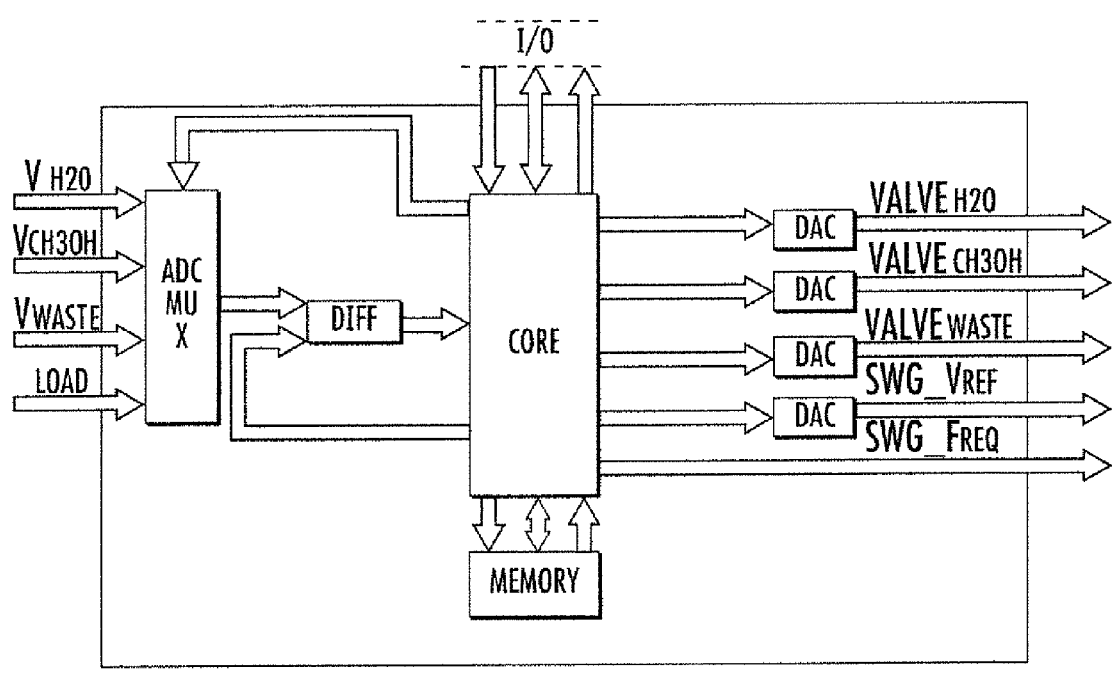
FIG. 12 depicts one architecture of the control unit according to the present invention.
Figure 13:
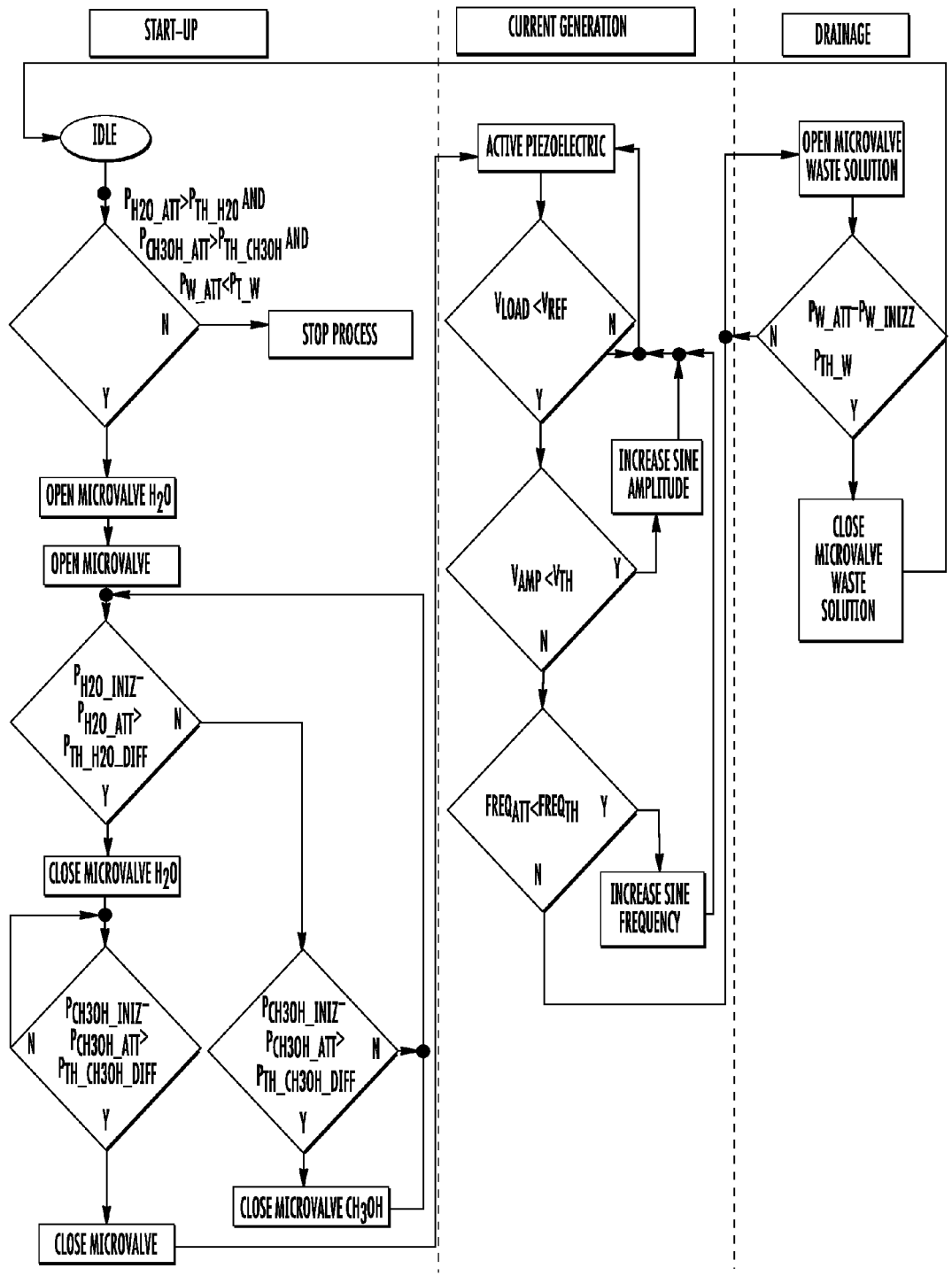
FIG. 13 is a flow chart of the three distinct phases of control of the operation of the fuel cell microfluidic feed system according to the present invention.

As depicted in FIG. 12, a processing CORE of the control unit, will normally have a number of I/O pads and a memory MEMORY for storing the codes of the implemented control algorithm. Logic circuitry DIFF will produce the difference values between the selected monitored parameter value, as converted by the multiplexed analog-to-digital converter ADC MUX, with a certain reference value provided by the processing CORE, difference that will constitute an input value to the CORE circuitry. The flow chart of the three distinct phases of control of the generator of a fuel cell microfluidic feed system is shown in FIG. 13.

That which is claimed:

1. A flow connector for a microfluidic system through which a solution is fed to a feed manifold of an energy converting electrochemical device having a flat coupling area with the flow connector, the flow connector comprising:
a monocrystalline silicon platform having a bottom side and an opposing top side, and a plurality of through holes extending therethrough, with each through hole aligned between the bottom and top sides, and said monocrystalline silicon platform comprising
a first channel configured as a first extended recess exposed on the bottom side for communicating with a first portion of the plurality of through holes,
a second channel configured as a second extended recess exposed on the bottom side and separate from the first channel for communicating with a second portion of the plurality of through holes, with the second portion of through holes being different from the first portion of through holes, and
said second channel forming an inlet for the feed manifold of the energy converting electrochemical device when the bottom side of said silicon platform is coupled to the flat coupling area of the energy converting electrochemical device;
a micropump module coupled to the top side of said monocrystalline silicon platform, and having a suction port coinciding with a first one of the through holes in the first portion of through holes in the first channel and a delivery port coinciding a first one of the through holes in the second portion of through holes in the second channel;
a first supply cartridge coupled to the top side of said monocrystalline silicon platform, and comprising a first solvent release microvalve module having a first outlet port coupled to said first channel through a second one of the through holes in the first portion of through holes so that the first outlet port is coupled to the suction port of said micropump module via the first channel; and
a second supply cartridge coupled to the top side of said monocrystalline silicon platform, and comprising a second oxidable compound release microvalve module having a second outlet port coupled to said first channel through a third one of the through holes in the first portion of through holes so that the second outlet port is coupled to the suction port of said micropump module via the first channel.

2. The flow connector according to claim 1, wherein the energy converting electrochemical device comprises a depleted solution discharge manifold having an outlet in the flat coupling area coinciding with said first channel; and further comprising a third cartridge coupled to the top side of said monocrystalline silicon platform, and comprising a third solution discharge microvalve module having an inlet port coupled to said second channel through a second one of the through holes in the second portion of through holes for bleeding the depleted solution therein.

3. The flow connector according to claim 1, wherein said monocrystalline silicon platform comprises at least one of a float zone (FZ) monocrystalline silicon wafer and a Czochralski (CZ) monocrystalline silicon wafer.

4. The flow connector according to claim 1, wherein said monocrystalline silicon platform has a thickness within a range of about 0.2 mm to 0.5 mm.

5. A microfluidic feed system of a solution for an energy converting electrochemical device having a flat coupling area that includes a feed solution distributing manifold inlet and a depleted solution discharge manifold outlet, the microfluidic feed system comprising:
- a monocrystalline silicon platform having a bottom side and an opposing top side, and a plurality of through holes extending therethrough, with each through hole aligned between the bottom and top sides, and said monocrystalline silicon platform comprising
  - a first channel configured as a first extended recess exposed on the bottom side for communicating with a first portion of the plurality of through holes,
  - a second channel configured as a second extended recess exposed on the bottom side and separate from the first channel for communicating with a second portion of the plurality of through holes, with the second portion of through holes being different from the first portion of through holes, and
  - said first channel coinciding with the depleted solution discharge manifold outlet, and said second channel coinciding with the feed solution distributing manifold inlet when the bottom side of said silicon platform is coupled to the flat coupling area of the energy converting electrochemical device;
- a micropump module coupled to the top side of said monocrystalline silicon platform, and having a suction port coinciding with a first one of the through holes in the first portion of through holes in the first channel and a delivery port coinciding a first one of the through holes in the second portion of through holes in the second channel;
- a first supply cartridge coupled to the top side of said monocrystalline silicon platform, and comprising a first solvent release microvalve module having a first outlet port coupled to said first channel through a second one of the through holes in the first portion of through holes so that the first outlet port is coupled to the suction port of said micropump module via the first channel; and
- a second supply cartridge coupled to the top side of said monocrystalline silicon platform, and comprising a second oxidable compound release microvalve module having a second outlet port coupled to said first channel through a third one of the through holes in the first portion of through holes so that the second outlet port is coupled to the suction port of said micropump module via the first channel.

6. The microfluidic feed system according to claim 5, further comprising a third cartridge coupled to the top side of said monocrystalline silicon platform, and comprising a third solution discharge microvalve module having an inlet port coupled to said second channel through a second one of the through holes in the second portion of through holes for bleeding the depleted solution therein.

7. The microfluidic feed system according to claim 5, wherein said monocrystalline silicon platform has a thickness within a range of about 0.2 mm to 0.5 mm.

8. A microfluidic system comprising:
- an energy converting electrochemical device having on a same side a flat coupling area that includes a feed solution distributing manifold inlet and a depleted solution discharge manifold outlet; and
- a microfluidic feed system for providing a solution to said energy converting electrochemical device, said microfluidic feed system comprising
  - a silicon platform having a bottom side and an opposing top side, and a plurality of through holes extending therethrough, with each through hole aligned between the bottom and top sides, and said silicon platform comprising
    - a first channel configured as a first extended recess exposed on the bottom side for communicating with a first portion of the plurality of through holes,
    - a second channel configured as a second extended recess exposed on the bottom side and separate from the first channel for communicating with a second portion of the plurality of through holes, with the second portion of through holes being different from the first portion of through holes, and
    - said first channel coinciding with the depleted solution discharge manifold outlet, and said second channel coinciding with the feed solution distributing manifold inlet when the bottom side of said silicon platform is coupled to the flat coupling area of said energy converting electrochemical device;
  - a micropump module coupled to the top side of said silicon platform, and having a suction port coinciding with a first one of the through holes in the first portion of through holes in the first channel and a delivery port coinciding a first one of the through holes in the second portion of through holes in the second channel;
  - a first supply cartridge coupled to the top side of said silicon platform, and comprising a first solvent release microvalve module having a first outlet port coupled to said first channel through a second one of the through holes in the first portion of through holes so that the first outlet port is coupled to the suction port of said micropump module via the first channel; and
  - a second supply cartridge coupled to the top side of said silicon platform, and comprising a second oxidable compound release microvalve module having a second outlet port coupled to said first channel through a third one of the through holes in the first portion of through holes so that the second outlet port is coupled to the suction port of said micropump module via the first channel.

9. The microfluidic system according to claim 8, wherein said silicon platform comprises a monocrystalline silicon platform.

10. The microfluidic system according to claim 8, further comprising a third cartridge coupled to the top side of said silicon platform, and comprising a third solution discharge microvalve module having an inlet port coupled to said second channel through a second one of the through holes in the second portion of through holes for bleeding the depleted solution therein.

11. The microfluidic system according to claim 10, wherein said energy converting electrochemical device comprises a single electrochemical cell having an anode compartment of which an aqueous solution of a fuel comprising methanol and ethanol is circulated by said micropump module.

12. The microfluidic system according to claim 10, wherein said energy converting electrochemical device comprises a plurality of electrochemical cells in a stack and having a plurality of anode compartments of which an aqueous solution of a fuel comprising methanol and ethanol is circulated by said micropump module.

13. The microfluidic system according to claim 8, wherein said silicon platform has a thickness within a range of about 0.2 mm to 0.5 mm.

14. A method for making a flow connector for a microfluidic system through which a solution is fed to a feed manifold of an energy converting electrochemical device having a flat coupling area with the flow connector, the method comprising:
providing a monocrystalline silicon platform having a bottom side and an opposing top side, and a plurality of through holes extending therethrough, with each through hole aligned between the bottom and top sides;
forming a first channel configured as a first extended recess exposed on the bottom side of the monocrystalline silicon platform for communicating with a first portion of the plurality of through holes;
forming a second channel configured as a second extended recess exposed on the bottom side of the monocrystalline silicon platform and separate from the first channel for communicating with a second portion of the plurality of through holes, with the second portion of through holes being different from the first portion of through holes;
forming an inlet via the second channel for the feed manifold of the energy converting electrochemical device when the bottom side of the silicon platform is coupled to the flat coupling area of the energy converting electrochemical device;
coupling a micropump module to the top side of the monocrystalline silicon platform, the micropump module having a suction port coinciding with a first one of the through holes in the first portion of through holes in the first channel and a delivery port coinciding a first one of the through holes in the second portion of through holes in the second channel;
coupling a first supply cartridge to the top side of the monocrystalline silicon platform, the first supply cartridge comprising a first solvent release microvalve module having a first outlet port coupled to the first channel through a second one of the through holes in the first portion of through holes so that the first outlet port is coupled to the suction port of the micropump module via the first channel; and coupling a second supply cartridge coupled to the top side of the monocrystalline silicon platform, the second supply cartridge comprising a second oxidable compound release microvalve module having a second outlet port coupled to the first channel through a third one of the through holes in the first portion of through holes so that the second outlet port is coupled to the suction port of the micropump module via the first channel.

15. The method according to claim 14, wherein the energy converting electrochemical device comprises a depleted solution discharge manifold having an outlet in the flat coupling area coinciding with the first channel; and further comprising coupling a third cartridge to the top side of the monocrystalline silicon platform, the third cartridge comprising a third solution discharge microvalve module having an inlet port coupled to the second channel through a second one of the through holes in the second portion of through holes for bleeding the depleted solution therein.

16. The method according to claim 15, wherein the energy converting electrochemical device comprises a single electrochemical cell having an anode compartment of which an aqueous solution of a fuel comprising methanol and ethanol is circulated by the micropump module.

17. The method according to claim 15, wherein the energy converting electrochemical device comprises a plurality of electrochemical cells in a stack and having a plurality of anode compartments of which an aqueous solution of a fuel comprising methanol and ethanol is circulated by the micropump module.

18. The method according to claim 14, wherein the monocrystalline silicon platform comprises at least one of a float zone (FZ) monocrystalline silicon wafer and a Czochralski (CZ) monocrystalline silicon wafer.

19. The method according to claim 14, wherein the monocrystalline silicon platform has a thickness within a range of about 0.2 mm to 0.5 mm.

* * * * *